United States Patent
Nail et al.

(10) Patent No.: US 7,831,230 B2
(45) Date of Patent: *Nov. 9, 2010

(54) TERMINAL AND ASSOCIATED TRANSDUCER ASSEMBLY AND METHOD FOR SELECTIVELY TRANSDUCING IN AT LEAST TWO FREQUENCY BANDS

(75) Inventors: David Nail, Flower Mound, TX (US); George Hutcheson, Dallas, TX (US)

(73) Assignee: Nokia Corporation, Espoo (FI)

( * ) Notice: Subject to any disclaimer, the term of this patent is extended or adjusted under 35 U.S.C. 154(b) by 56 days.

This patent is subject to a terminal disclaimer.

(21) Appl. No.: 12/326,337

(22) Filed: Dec. 2, 2008

(65) Prior Publication Data

US 2009/0111407 A1    Apr. 30, 2009

Related U.S. Application Data

(63) Continuation of application No. 10/940,843, filed on Sep. 14, 2004, now Pat. No. 7,469,131.

(51) Int. Cl.
  *H04B 1/18* (2006.01)
(52) U.S. Cl. .............. 455/168.1; 455/552.1; 455/553.1; 455/180.1; 455/188.1; 343/858; 343/767; 343/700 MS; 333/126; 333/129
(58) Field of Classification Search .............. 455/168.1, 455/180.1, 188.1, 190.1, 193.2, 338, 552.1, 455/553.1; 333/126, 103, 129, 132–135; 343/700 MS, 702, 895, 790, 767, 858
See application file for complete search history.

(56) References Cited

U.S. PATENT DOCUMENTS 4,410,866 A    10/1983    Bui-Hai (Continued)

FOREIGN PATENT DOCUMENTS

EP    0892459 A1    1/2004

(Continued)

OTHER PUBLICATIONS

*SkyCross Announces New 800 MHz-2.5GHz Antenna for Telematics and Other Wireless Applications*; Apr. 2001; 2 pages; available at <http://www.bbwexchange.com/news/archive/archived_broadband_wireless_files_2001/> (visited Aug. 13, 2004).

(Continued)

*Primary Examiner*—Edward Urban
*Assistant Examiner*—Junpeng Chen
(74) *Attorney, Agent, or Firm*—Alston & Bird LLP

(57) ABSTRACT

A terminal is provided for selectively communicating in at least two frequency bands. The terminal includes an antenna transducer including a first port and a second port, where the antenna transducer is capable of selectively transducing first radio signals (e.g., low power radio frequency (LPRF) signals) to and/or from the first port, and/or second radio signals (e.g., global positioning system (GPS) signals) to and/or from the second port. In this regard, the antenna transducer is capable of transducing first radio signals such that an impedance at the second port approaches a short circuit or an open circuit, and capable of transducing second radio signals such that an impedance at the first port approaches an open circuit. An associated communication assembly and method for selectively communicating in at least two frequency bands are also provided.

25 Claims, 4 Drawing Sheets

U.S. PATENT DOCUMENTS

| | | |
|---|---|---|
| 5,268,696 A | 12/1993 | Buck et al. |
| 5,771,026 A | 6/1998 | Stengel, Jr. |
| 5,963,180 A | 10/1999 | Leisten |
| 6,204,819 B1 | 3/2001 | Hayes et al. |
| 6,414,640 B1 | 7/2002 | Eggleston |
| 6,466,180 B2 | 10/2002 | Stengel, Jr. |
| 6,480,155 B1 | 11/2002 | Eggleston |
| 6,515,557 B1 | 2/2003 | Wangsvick et al. |
| 6,531,933 B2 | 3/2003 | Miyamoto et al. |
| 6,618,011 B2 | 9/2003 | Eggleston et al. |
| 6,646,610 B2 | 11/2003 | Troelsen |
| 6,664,927 B2 | 12/2003 | Eggleston |
| 6,836,256 B2 | 12/2004 | Hung |
| 6,864,848 B2 | 3/2005 | Sievenpiper |
| 6,897,812 B2 | 5/2005 | Huang |
| 7,057,568 B2 * | 6/2006 | Louzir et al. ............... 343/767 |
| 7,126,440 B2 | 10/2006 | Bradley et al. |
| 7,181,171 B2 | 2/2007 | Forrester |
| 2002/0089454 A1 | 7/2002 | Eggleston et al. |
| 2002/0135521 A1 | 9/2002 | Moore |
| 2003/0122715 A1 * | 7/2003 | Aikawa et al. ........ 343/700 MS |
| 2004/0121828 A1 | 6/2004 | Wang et al. |
| 2004/0135729 A1 | 7/2004 | Talvitie et al. |
| 2004/0137950 A1 | 7/2004 | Bolin et al. |
| 2005/0035824 A1 * | 2/2005 | Kearns ..................... 333/103 |
| 2005/0038524 A1 | 2/2005 | Kearns |

FOREIGN PATENT DOCUMENTS

| | | |
|---|---|---|
| EP | 0892459 B1 | 1/2004 |
| KR | 1999-0037171 A | 5/1999 |
| KR | 2004-0076373 A | 9/2004 |
| WO | WO 96/29756 A1 | 9/1996 |

OTHER PUBLICATIONS

*SkyCross Develops Industry's First Embedded Antenna Combining Cellular, PCS, GPS and WLAN Coverage*; Dec. 2001; 2 pages; available at <http://www.skycorss.com/20011203_triband.asp> (visited Aug. 13, 2004).

Jamal S. Izadian; *Antenna Snares GPS/WLAN Signals*; Microwave &RF; Jun. 2004; 12 pages; available at <http://www..mwrf.com/Articles/Print.cfm?ArticleID=8317> (visited Aug. 13, 2004).

International Preliminary Report on Patentability and Written Opinion for Application No. PCT/IB2005/002652 mailed Mar. 29, 2007.

Non-Final Rejection for Application No. KR 10-2007-7008544 dated Mar. 13, 2008.

Non-Final Rejection for Application No. KR 10-2007-7008544 dated Oct. 24, 2008.

Notice of Allowance for Application No. KR 10-2007-7008544 dated Apr. 24, 2009.

* cited by examiner

US 7,831,230 B2

TERMINAL AND ASSOCIATED TRANSDUCER ASSEMBLY AND METHOD FOR SELECTIVELY TRANSDUCING IN AT LEAST TWO FREQUENCY BANDS

CROSS-REFERENCE TO RELATED APPLICATIONS

This application is a continuation of U.S. application Ser. No. 10/940,843, filed Sep. 14, 2004, now U.S. Pat. No. 7,469,131 which is hereby incorporated herein in its entirety by reference.

FIELD OF THE INVENTION

The present invention generally relates to wireless communication and, more particularly, to systems and associated terminals and methods for selective wireless communication in at least two frequency bands, such as global positioning system (GPS) and a low power radio frequency (LPRF) frequency bands.

BACKGROUND OF THE INVENTION

Mobile telephones have drastically developed during the past decade so that in the near future, the most developed telephones will provide cellular, global position system (GPS) and low power radio frequency (LPRF) radio (e.g., wireless local area network (WLAN), Bluetooth, ultrawideband (UWB), radio frequency identification (RFID), etc.) communications all in the same portable device. Typically, these devices are designed to be hand held, but other form factors such as wristwatch type and wearable devices may also emerge. Conventionally, such devices typically include two or more antennas to support the different types of wireless communications. In addition, many developed telephones will provide for antenna diversity in one or more of these communication techniques by including multiple antennas that provide communication in accordance with the same type of communication.

An antenna radiates electromagnetic waves with a power that is a function of its electric feed signal's power and frequency. An antenna has a resonant frequency at which it has the highest gain, the gain often referred to as the radiation power. The highest radiation power not only affects the transmission efficiency but also the reception efficiency so that an antenna is also most sensitive to receive radio signals at its resonant frequency or frequencies. Hence, an antenna best absorbs radio signals at its resonant frequency.

With two or more different antennas used for different radio communications such as GPS and LPRF, for instance, the frequency bands on which these antennas operate are very close to each other or overlap, because many new radio standards share the frequency bands around 1.5-2.4 GHz region. The antennas are bound to reside close to each other if the entire apparatus housing them is small, perhaps a few centimeters in maximum dimension, and hence the coupling between the antennas is also bound to increase. Generally, coupling between antennas is a condition when a portion of the radio signals transmitted by one antenna are captured by another antenna. Typically, as the coupling between antennas increases, so does the interference between the radio receivers and transmitters. Thus, it becomes more difficult to filter the undesired interference from the other transmitter. It is thus necessary to ensure a sufficient level of isolation to provide satisfactory efficiency for the transmissions.

As will be appreciated, coupling not only takes place when two different antennas are used in proximity to each other, but the mere existence of the second antenna will often draw some radio power. In this regard, the radio power draw increases the closer the antennas are placed to one another, and the closer their resonant frequencies. Thus, the isolation has often been enhanced by locating different antennas as far from each other as possible, such as by using different polarizations, manually removing an unused antenna from the device for periods when the unused antenna is not needed, placing radiation obstacles between the antennas, and/or disconnecting the ground or feed of unused antennas. And whereas designing wireless communication devices to include separate antennas is adequate for providing communication in accordance with different types of wireless communications, it is always desirable to improve upon such designs. In this regard, due to portability requirements, the size of the radio device should be kept to a bare minimum while maintaining isolation for communicating in accordance with different wireless communications techniques.

SUMMARY OF THE INVENTION

In light of the foregoing background, embodiments of the present invention provide an improved terminal and associated communication assembly and method for communicating in at least two frequency bands. In accordance with embodiments of the present invention, a single antenna transducer is capable of supporting signals in accordance with GPS communication and signals in accordance with LPRF communication, and if so desired, signals generated pursuant to effectuation of cellular communication. In this regard, the terminal of embodiments of the present invention can include communication assemblies coupled to the antenna transducer at different ports, and capable of communicating in accordance with different communication techniques in different frequency bands. The communication assemblies can then be configured such that when one communication assembly is communicating via the antenna transducer, the other communication assembly has an impedance approaching or approximately equal to an open circuit or a short circuit. The other communication assembly therefore permits the communicating assembly to transmit and/or receive a sufficient portion of the signals intended for the antenna transducer and/or the communicating assembly, respectively. The antenna transducer and communication assemblies of embodiments of the present invention obviate the existing need for separate antenna transducers to be positioned apart from one another to minimize the possibility that operation of the antenna transducer and one communication assembly might inhibit operation of the antenna transducer and the other communication assembly. As a result, because a single antenna construction is provided, the physical dimensional requirements of the antenna transducer are reduced relative to conventional implementations.

According to one aspect of the present invention, a terminal is provided that is adapted to selectively transduce radio signals in at least two frequency bands. The terminal includes an antenna transducer (e.g., inverted F-antenna (IFA) transducer) including a first port and a second port, where the antenna transducer is capable of selectively transducing first radio signals (e.g., low power radio frequency (LPRF) signals, global positioning system (GPS) signals, etc.) to and/or from the first port within a first frequency band, and/or second radio signals (e.g., LPRF signals, GPS signals, etc.) to and/or from the second port within a second frequency band. In this regard, the antenna transducer is capable of transducing first radio signals such that an impedance at the second port approaches a short circuit or an open circuit, and is capable of transducing second radio signals such that an impedance at the second port approaches an open circuit.

The terminal can also include a first communication assembly coupled to the antenna transducer at the first port of the antenna transducer, where the first communication assembly is configured to operatively communicate first radio signals within a first frequency band via the antenna transducer. The antenna transducer assembly is capable of transducing second radio signals such that the first communication assembly has an impedance at the first port approaching an open circuit within the second frequency band. More particularly, the first communication assembly can include a first communication circuitry, a first filter and a first transformation element (e.g., transmission line), where the first filter is coupled between the first communication circuitry and the first transformation element, and the first transformation element is coupled to the first port of the antenna transducer.

Thus, the antenna transducer can be capable of transducing second radio signals such that the first transformation element transforms an impedance of the first filter at the first transformation element to the open circuit impedance of the first communication assembly at the first port. More particularly, the first filter can have an impedance at the first transformation element approaching a short circuit or an open circuit. The antenna transducer can therefore be capable of transducing second radio signals such that the first transformation element transforms the short circuit impedance of the first filter to the open circuit impedance of the first communication assembly at the first port, or maintains the open circuit impedance of the first filter at approximately the same open circuit impedance of the first communication assembly at the first port.

Similarly, the terminal can further include a second communication assembly coupled to the antenna transducer at the second port of the antenna transducer, where the second communication assembly is configured to operatively communicate second radio signals within a second frequency band via the antenna transducer. The antenna transducer can be capable of transducing first radio signals such that the second communication assembly has an impedance at the second port approaching a short circuit or an open circuit within the first frequency band. The second communication assembly can likewise include a second communication circuitry, a second filter and a second transformation element, where the second filter is coupled between the second communication circuitry and the second transformation element, and the second transformation element is coupled to the second port of the antenna transducer.

The antenna transducer can therefore be capable of transducing first radio signals such that the second transformation element transforms an impedance of the second filter at the second transformation element to the short circuit or open circuit impedance of the second communication assembly at the second port. More particularly, the second filter can have an impedance at the second transformation element approaching a short circuit or an open circuit. The antenna transducer can therefore be capable of transducing first radio signals such that the second transformation element transforms the short circuit or open circuit impedance of the second filter to the same or the other of the short circuit or open circuit impedance of the second communication assembly at the second port.

If so desired, the antenna transducer can include a primary transducer portion and a secondary transducer portion. In such instances, the primary transducer portion can be configured to effectuate communication in accordance with a cellular communication technique. The second transducer portion, in turn, can include the first port and the second port, and therefore be configured to effectuate communication in accordance with the first and second signals.

According to other aspects of the present invention, a communication assembly and method are provided for communicating in at least two frequency bands. Embodiments of the present invention permit a single antenna transducer to effectuate communication in accordance with first signals within a first frequency band, and second signals within a second frequency band. In this regard, when a first communication assembly is communicating first signals, the second communication assembly can have an impedance approaching or approximately equal to an open circuit or a short circuit at the antenna transducer, or more particularly a second port of the antenna transducer. Conversely, when a second communication assembly is communicating second signals, the first communication assembly can have an impedance approaching or approximately equal to an open circuit at the antenna transducer, or more particularly a first port of the antenna transducer. Thus, each communication assembly can be capable of communicating via the antenna transducer with reduced, if not eliminated, interference from the other communication assembly. Therefore, the terminal, and associated communication assembly and method of embodiments of the present invention solve the problems identified by prior techniques and provide additional advantages.

BRIEF DESCRIPTION OF THE DRAWINGS

Figure 1:
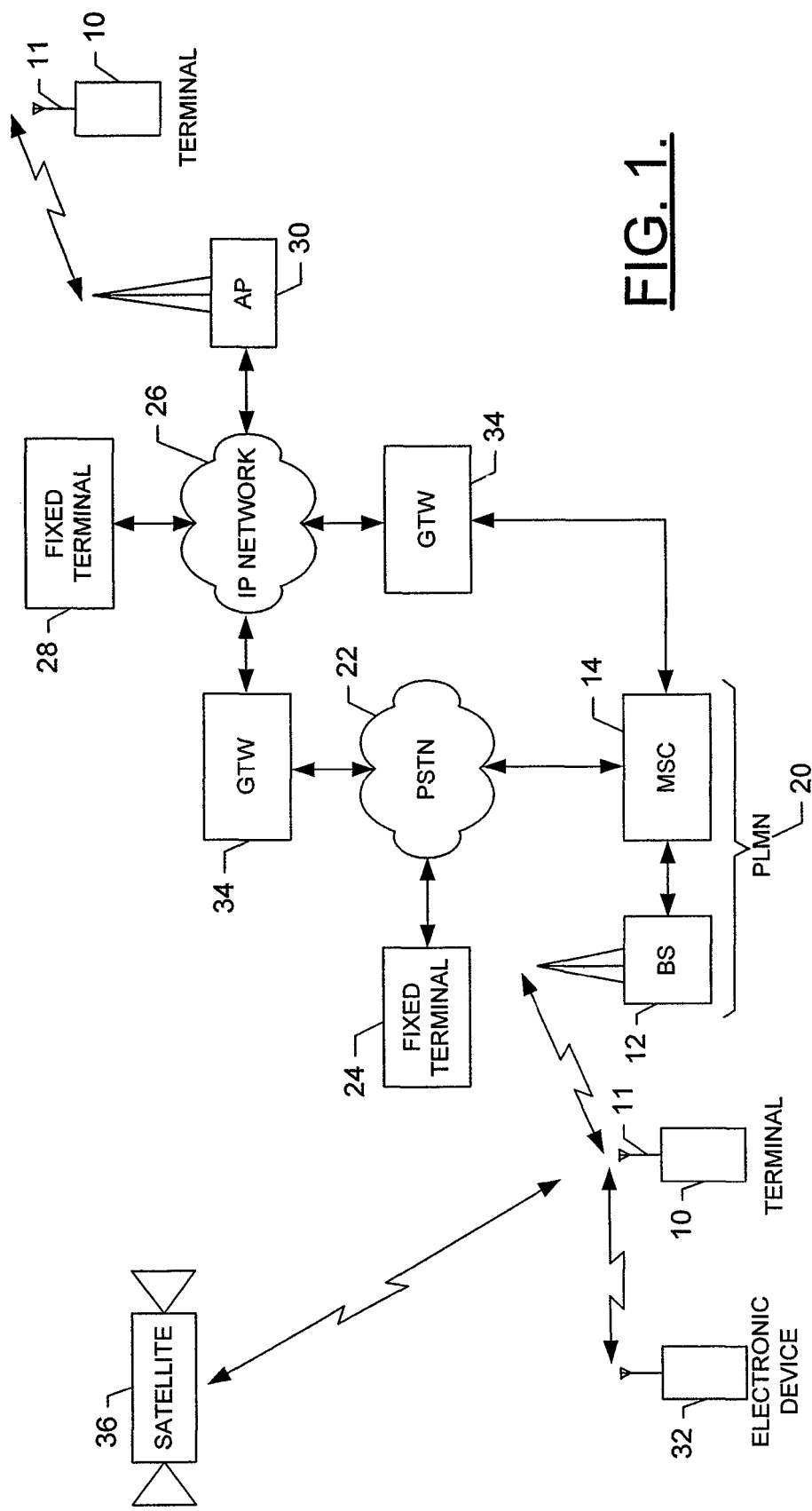
Figure 2:
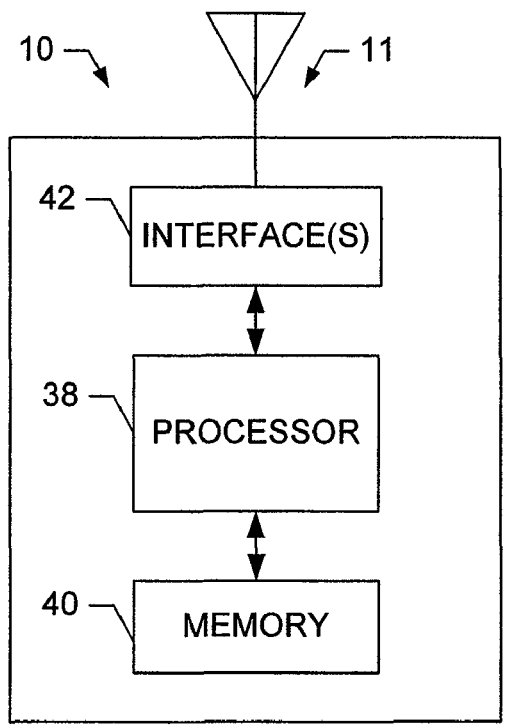
Figure 3:
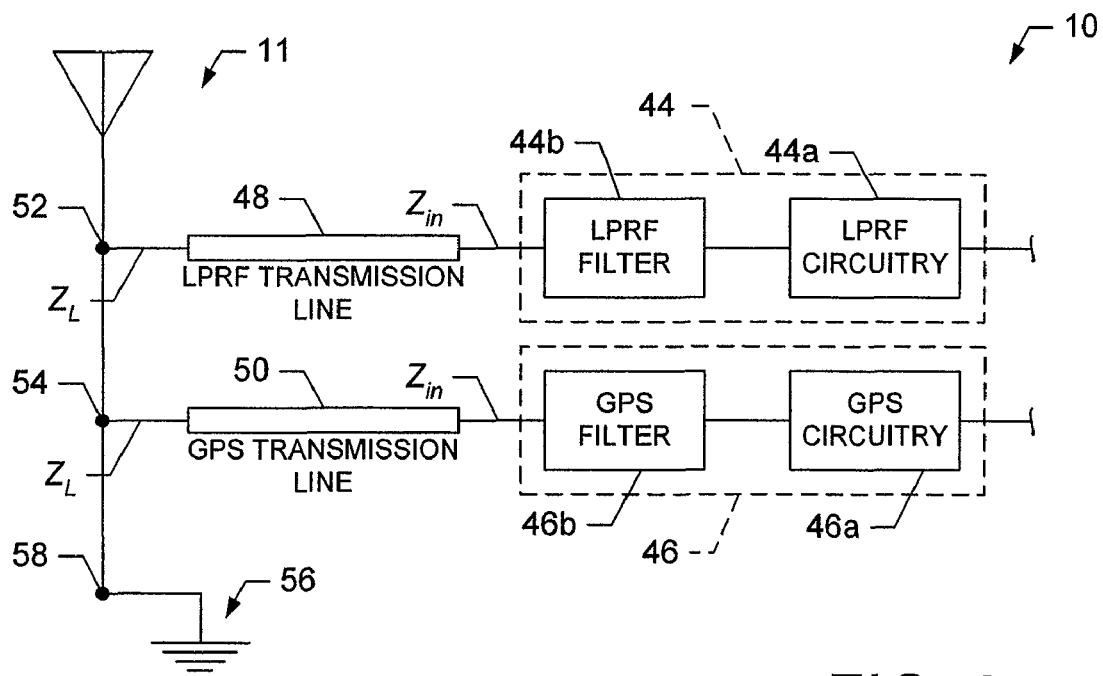
Figure 4A:
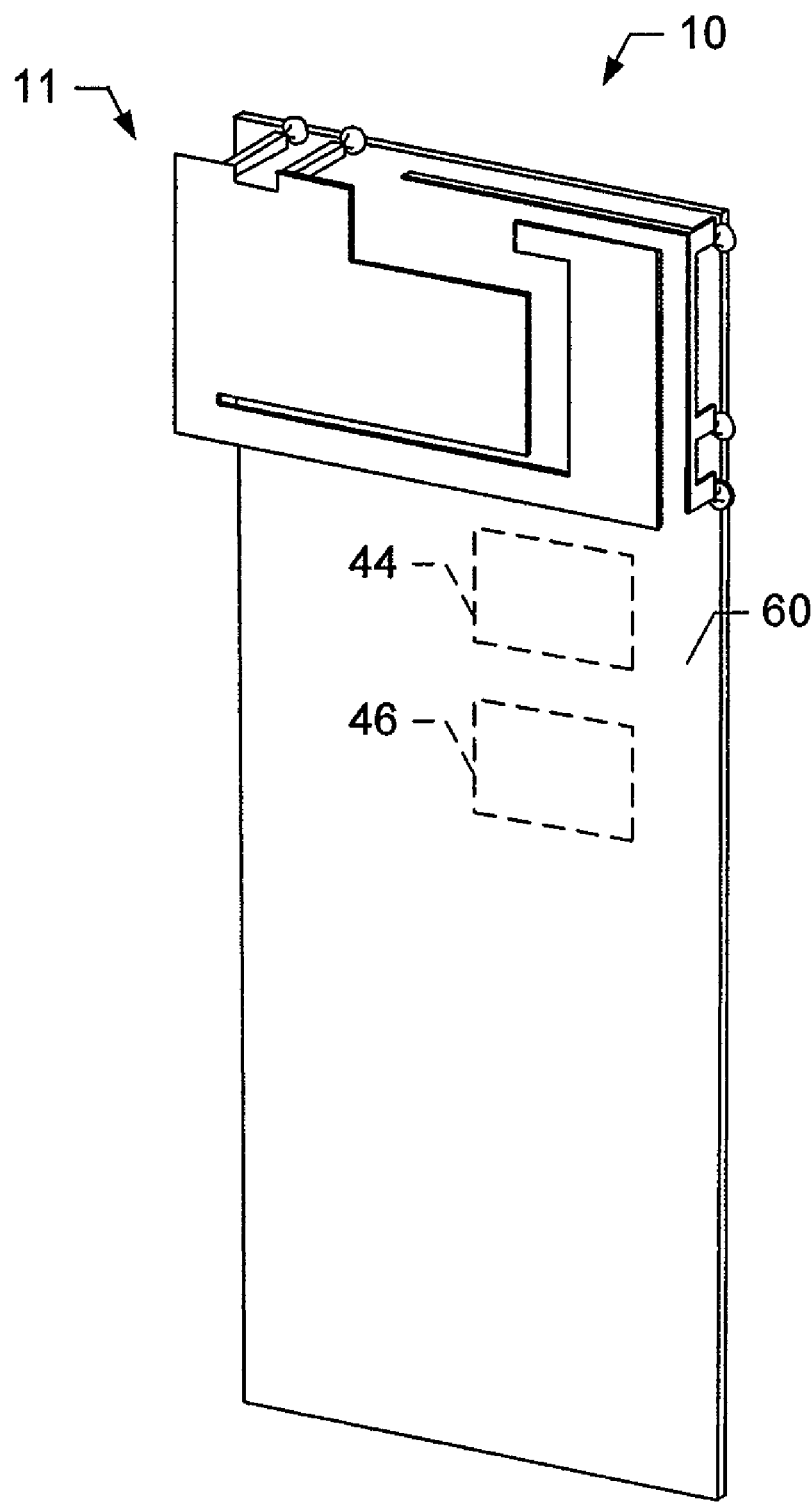
Figure 4B:
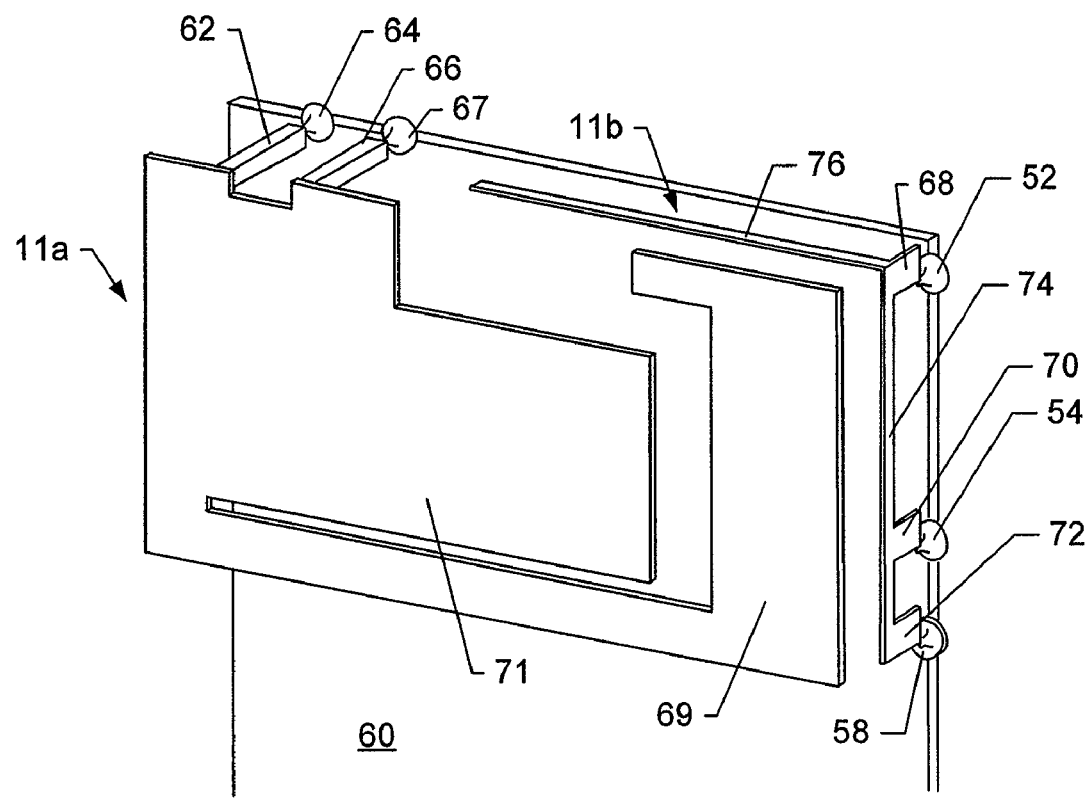
Figure 5:
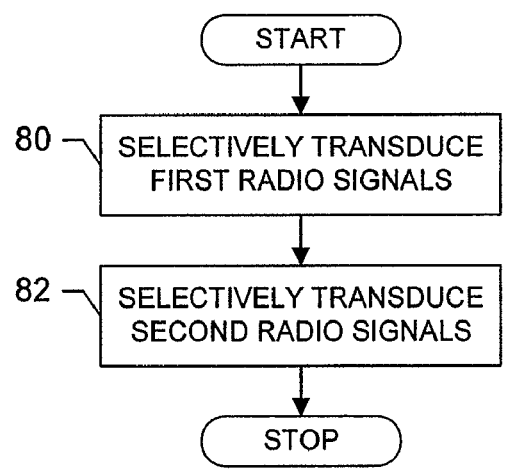

Having thus described the invention in general terms, reference will now be made to the accompanying drawings, which are not necessarily drawn to scale, and wherein:

FIG. 1 is a schematic block diagram of a communications system according to one embodiment of the present invention including a cellular network, a public-switched telephone network and a data network;

FIG. 2 is a schematic block diagram of an entity capable of operating as a mobile terminal and/or a fixed terminal, in accordance with embodiments of the present invention;

FIG. 3 is a block diagram illustrating a portion of a mobile terminal in accordance with an embodiment of the present invention;

FIGS. 4A and 4B illustrate a perspective view of a portion of a mobile terminal highlighting an antenna transducer of one embodiment of the present invention; and FIG. 5 is a flowchart illustrating various steps in a method of selectively communicating in at least two frequency bands in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of communications system that would benefit from the present invention is provided. It should be understood, however, that the terminals illustrated and hereinafter described are merely illustrative of two types of terminals that would benefit from the present invention and, therefore, should not be taken to limit the scope of the present invention. The system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, a mobile terminal 10 includes an antenna transducer 11 for transmitting and receiving signals in accordance with a number of different wireless communication techniques. More particularly, for example, the mobile terminal can include an antenna transducer for transmitting signals to and receiving signals from a base site or base station (BS) 12 in one or more of a cellular network, personal communication services (PCS) network and the like. The base station is a part of a cellular network that includes a mobile switching center (MSC) 14 and other units required to operate the cellular network. The MSC is capable of routing calls and messages to and from the mobile terminal when the mobile terminal is making and receiving calls. The MSC also controls the forwarding of messages to and from the mobile terminal when the terminal is registered with the cellular network, and controls the forwarding of messages for the mobile terminal to and from a message center (not shown). As will be appreciated by those skilled in the art, the cellular network may also be referred to as a Public Land Mobile Network (PLMN) 20.

The PLMN 20 is capable of providing communications in accordance with a number of different cellular communication techniques. In this regard, the PLMN is capable of operating in accordance with any of a number of first-generation (1G), second-generation (2G), 2.5G and/or third-generation (3G) communication techniques, and/or any of a number of other cellular communication techniques capable of operating in accordance with embodiments of the present invention. For example, the PLMN can be capable of operating in accordance with GSM (Global System for Mobile Communication), IS-136 (Time Domain Multiple Access—TDMA), IS-95 (Code Division Multiple Access—CDMA), or EDGE (Enhanced Data GSM Environment) communication techniques. Within the PLMN, signaling communications may be provided in accordance with any of a number of different techniques, but signaling communications are typically provided in accordance with the Signaling System 7 (SS7) standard.

The MSC 14, and thus the PLMN 20, can be coupled to a Public Switched Telephone Network (PSTN) 22 that, in turn, is coupled to one, or more typically, a plurality of circuit-switched fixed terminals 24, such as wireline and/or wireless telephones. Like the PLMN, the PSTN is capable of providing signaling communications in accordance with any of a number of different techniques, including SS7. The PSTN is also capable of providing audio communications in accordance with any of a number of different techniques. For example, the PSTN may operate in accordance with Time Division Multiplexing (TDM) techniques, such as 64 Kbps (CCIT), and/or Pulse Code Modulation (PCM) techniques, such as 56 Kbps (ANSI).

The PLMN 20 (via the MSC 14) and the PSTN 22 can be coupled to, electrically connected to, or otherwise in electrical communication with a packet-switched network, such as an Internet Protocol (IP) network 26. Whereas the PLMN and the PSTN can be directly coupled to the IP network, in one embodiment the PLMN and PSTN are indirectly coupled to the IP network by respective gateways (GTWs) 34. The IP network may be coupled to one or more packet-switched fixed terminals 28. Additionally, the IP network may be coupled to one or more wireless access points (APs) 30, to which devices such as a terminal 10 may be coupled. In this regard, the terminal can be coupled to the AP in any of a number of different manners, such as in accordance with a low power radio frequency (LPRF) technique, such as wireless local area network (WLAN) (e.g., IEEE 802.11), Bluetooth and/or ultrawideband (UWB) techniques.

Like the AP 30, the terminal 10 be coupled to one or more other electronic devices 32, such as other mobile terminals, car guidance systems, personal computers, laptop computers and the like, in accordance with a LPRF technique. Like being coupled to the AP, the terminal can be coupled to other electronic device(s) in any of a number of different manners. For example, the terminal can be coupled to other electronic devices in accordance with WLAN, Bluetooth and/or UWB techniques, as well as any of a number of other LPRF techniques including radio frequency identification (RFID) techniques. As will be appreciated, by directly or indirectly coupling the terminal 10 and other electronic devices, the terminal can communicate with the other electronic devices, to thereby carry out various functions of the terminal.

The terminal 10 can be further coupled to one or more satellite antennas 36 capable of determining, or facilitating the terminal determining, a geographic position of the terminal. In this regard, the terminal can be coupled to the antenna in accordance with a number of different positioning techniques, such as a global positioning (GPS) technique. In this regard, the terminal can be capable of receiving or otherwise detecting time-of-arrival (TOA) signals from one or more satellite antennas. The terminal can then be capable of determining its position based upon the TOA signals. For example, the terminal can be adapted to determine its position in accordance with a conventional trilateration technique based upon three TOA signals.

Referring now to FIG. 2, a block diagram of an entity capable of operating as a mobile terminal 10 is shown in accordance with one embodiment of the present invention. As shown, the entity capable of operating as a terminal can generally include a processor 38 connected to a memory 40. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

The processor 38 can also be connected to at least one interface 42 or other means for transmitting and/or receiving data, content or the like. Along with an antenna transducer 11, the interface(s) can include a means for communicating in accordance with any one or more of a number of different communication techniques. For example, the interface(s) can include means for communicating in accordance with any of a number of 1G, 2G, 2.5G and/or 3G communication techniques.

The interface(s) 42 can also include one or more means for sharing and/or obtaining data in accordance with one or more LPRF techniques. For example, the interface(s) can include a WLAN module comprising a WLAN transmitter, receiver or transceiver so that data can be shared with and/or obtained from other electronic devices 32 that include other WLAN modules. Additionally or alternatively, the interface(s) can include a Bluetooth module comprising a Bluetooth transmitter, receiver or transceiver, a UWB module comprising a UWB transmitter, receiver or transceiver, and/or a RFID module comprising a RFID transmitter, receiver or transceiver. In such instances, the terminal 10 can share and/or obtain data from other electronic devices that similarly include other Bluetooth, UWB and/or RFID modules, respectively. Further, the interface(s) can include a positioning module, such as a GPS module. As indicated above, the GPS module can be capable of receiving or otherwise detecting TOA signals from one or more satellite antennas 36 such that the terminal can then determine its position.

To effectuate cellular communication of the mobile terminal 10, forward-link signals transmitted by a base station 12 to the terminal can be converted from an electromagnetic form to an electrical form by the antenna transducer 11. Similarly, reverse-link signals originated at the terminal to be transmitted to a base station can also be transduced by the antenna transducer. If so desired, the same antenna transducer can also be configured to effectuate communication of the mobile terminal in accordance with a GPS technique. In this regard, the same antenna transducer can be configured to receive, and convert into electrical form, positioning (e.g., TOA) signals transmitted from a satellite antenna 36 in accordance with a GPS technique. For more information on such a transducer, see U.S. Pat. No. 6,618,011, entitled: Antenna Transducer Assembly, and an Associated Method Therefore, issued Sep. 9, 2003, the contents of which are hereby incorporated by reference in its entirety.

As will be appreciated, in lieu of configuring the antenna transducer 11 to effectuate both cellular communication and GPS communication, the mobile terminal 10 can include separate transducers for effectuating each type of communication. In accordance with embodiments of the present invention, however, the transducer effectuating GPS communication can also be configured to effectuate communication of the terminal in accordance with a LPRF technique, irrespective of whether the terminal includes separate transducers effectuating cellular communication and GPS communication. More particularly, to permit the terminal to receive signals from other electronic devices 32 in accordance with a LPRF technique, forward-link signals communicated by another electronic device to the terminal are converted from an electromagnetic form into an electrical form at the same antenna transducer effectuating GPS communication. Conversely, to permit the terminal to transmit signals to other electronic devices in accordance with a LPRF technique, reverse-link signals originated at the terminal can also be transduced by the same antenna transducer.

Embodiments of the present invention therefore permit a single antenna transducer 11 construction to transduce signals generated pursuant to effectuation of GPS communication and signals generated pursuant to effectuation of LPRF communication, and if so desired, signals generated pursuant to effectuation of cellular communication. As will be appreciated, the frequency bands within which LPRF communication is effectuated and within which GPS signals are transmitted are typically dissimilar. Conventional antenna transducers and associated communication modules (e.g., GPS and LPRF communication modules), however, may generate signal energy, particularly reverse-link signals, that inhibit desired communication. The terminal 10 and antenna transducer construction of embodiments of the present invention obviate the existing need for separate antenna transducers to be positioned apart from one another to minimize the possibility that operation of the antenna transducer and GPS module effectuating GPS communication might inhibit operation of the antenna transducer and LPRF module effectuating LPRF communication, or vice versa. As a result, because a single antenna construction is provided, the physical dimensional requirements of the antenna transducer are reduced relative to conventional implementations.

Reference is now made to FIG. 3, which more particularly illustrates a block diagram of a portion of a mobile terminal 10 in accordance with an embodiment of the present invention, including an antenna transducer 11 and an interface 42 including a first communication module 44 and a second communication module 46. The first communication module is capable of effectuating the transmission and/or reception of radio signals within a first frequency band. The second communication module, on the other hand, is capable of effectuating the transmission and/or reception of radio signals lower than the first frequency band. As explained below, the first communication module comprises an LPRF module 44 capable of operating in accordance with a LPRF communication technique, whereas the second communication module comprises a GPS module 46 capable of operating in accordance with a GPS communication technique. It should be understood, however, that the first and second communication modules can comprise any of a number of different modules without departing from the spirit and scope of the present invention. For example, the first communication module can alternatively comprise a PCS module capable of operating in accordance with a PCS communication technique, while the second communication module comprises a cellular module 46 capable of operating in accordance with a cellular communication technique.

As shown, the antenna transducer 11 and LPRF module 44 are electrically coupled via a LPRF transformation element. Similarly, the antenna transducer and GPS module 46 are electrically coupled via a GPS transformation element. As explained below, the transformation elements are capable of transforming or otherwise maintaining an impedance of the respective modules at the antenna transducer to thereby isolate the modules from one another during operation. In one typical embodiment, for example, the transformation elements comprise transmission lines, such as microstrip transmission lines. More particularly, the transformation elements of one embodiment comprise an LPRF transmission line 48 coupling the antenna transducer and LPRF module, and a GPS transmission line 50 coupling the antenna transducer and the GPS module. As described below, then, the transformation elements comprise transmission lines. It should be understood, however, that the transformation elements can additionally or alternatively include any of a number of other elements, such as a number of lumped circuit elements, capable of performing the functions described below with respect to the respective transmission lines. As also explained below, the LPRF module more particularly comprises a WLAN module for communicating in accordance with a WLAN technique. It should be understood, however, that the LPRF module can alternatively comprise any of a number of other modules for communicating in accordance with any of a number of other LPRF techniques, including Bluetooth, UWB and/or RFID techniques.

The LPRF module 44 can comprise LPRF circuitry 44a, such as LPRF transceiver circuitry including a receiver portion having, for example, down-conversion and demodulation circuitry and a data sink. The LPRF circuitry can also include a transmitter portion having, for example, modulation and up-conversion circuitry. In addition to the LPRF circuitry, the LPRF module can include a LPRF filter 44b that can be coupled to the LPRF transmission line 48, which is in turn coupled to the antenna transducer by way of a LPRF port 52 of the antenna transducer. To facilitate isolating the LPRF circuitry, the LPRF filter is configured such that the impedance of the LPRF filter at the LPRF transmission line (i.e., $Z_{in}$) approaches a short circuit at the operative frequency band of the GPS module 46 (e.g., approximately 1,575 MHz) to thereby at least partially prevent the transmission and/or reception of signals from and/or to the LPRF circuitry at the GPS operative frequency band. Otherwise, the LPRF filter is configured to at least partially permit the transmission and/or reception of signals from and/or to the LPRF circuitry.

Similarly, the GPS module 46 can comprise GPS circuitry 46a, such as GPS receiver circuitry including a receiver portion having, for example, down-conversion and demodulation circuitry and a data sink. The GPS module can also include a GPS filter 46b that is coupled to the GPS transmission line 50, which is in turn coupled to the antenna transducer by way of a GPS port 54 of the antenna transducer. Similar to the LPRF filter 44b, the GPS filter is configured such that the impedance of the GPS filter at the GPS transmission line approaches a short circuit or an open circuit at the operative frequency band of the LPRF module 44 (e.g., approximately 2,442 MHz for WLAN) to thereby at least partially prevent the transmission and/or reception of signals from and/or to the GPS circuitry at the LPRF operative frequency band. Alternatively, the GPS filter can be configured such that the impedance of the GPS filter at the GPS transmission line approaches an open circuit at the LPRF operative frequency band. In either event, at frequencies other than those of the LPRF operative frequency band, the GPS filter is configured to at least partially permit the transmission and/or reception of signals from and/or to the GPS circuitry.

As also shown, the antenna transducer 11 is further coupled to an electrical ground plane 56 by way of a ground port 58. While not separately shown, portions of the LPRF module 44 and GPS module 46 are also coupled to the ground plane. The antenna transducer is operable during operation of the mobile terminal 10 to transduce communication signals into and out of electromagnetic form.

As will be appreciated, the antenna transducer 11 can comprise any of a number of different transducers capable of transducing signals. In one embodiment, for example, the transducer comprises an inverted F-antenna (IFA), such as a planar IFA. Referring now to FIGS. 4A and 4B, a portion of the mobile terminal 10 is shown, highlighting one exemplar IFA capable of functioning as the antenna transducer of one embodiment of the present invention. As shown, the antenna transducer includes a primary transducer portion 11a configured to effectuate communication in accordance with a cellular communication technique, and a secondary transducer portion 11b configured to effectuate GPS communication and LPRF communication. As indicated above, however, the terminal can include separate transducers for effectuating cellular communication and GPS/LPRF communication.

Circuitry for cellular communication (not shown) is disposed on a substrate 60 that can comprise, for example, a printed wiring board (PWB). In addition, the LPRF and GPS modules 44, 46 are disposed on the substrate. The circuitry can then be coupled with ports of the antenna transducer by way of transmission lines. The antenna transducer 11 is formed, or mounted upon, the same substrate upon which the cellular circuitry and LPRF/GPS modules are disposed. The antenna transducer is formed of transmission lines operable to transduce signals at the frequency bands in which the cellular communication system, GPS and LPRF are operable.

More particularly, the primary transducer portion 11a is positioned at a selected elevation above the substrate 60, such as at an elevation of approximately 10 mm above the substrate. In this regard, although not shown, the primary transducer portion can be disposed or otherwise secured to a top surface of a carrier which, in turn, is secured or otherwise secured to the substrate. The primary transducer portion includes a downwardly-projecting cellular feed line contact 62 that engages, and becomes electrically coupled to, a cellular port 64 of the antenna transducer. The primary transducer portion also includes a downwardly-projecting ground contact 66 that engages, and becomes electrically coupled to, a ground port 67 of the antenna transducer, the ground port being further coupled to the substrate (i.e., electrical ground plane 56).

The primary transducer portion 11a also includes a first arm 69 and a second arm 71. The arms are of selected lengths, which can be the same or different from one another. In this regard, when the arms are of different lengths, phase differences can exist between the radio frequency-energy coupled from the separate arms. Through appropriate selection of the lengths of the arms, and the relative differences therebetween, the primary transducer portion can be caused to exhibit characteristics whereby the energy of the separate arms cancel one another out at the frequencies in which either the LPRF module 44 or the GPS module 46 is operable. In this regard, for example, when the LPRF module comprises a WLAN module, the LPRF module can be operable at approximately 2,442 MHz frequency levels, while the GPS module can be operable at approximately 1,575.42 MHz frequency levels. The primary transducer portion can therefore be of dimensions such that the RF energy of the first and second arms cancel out one another at frequencies including the 2,442 MHz and/or 1,575.42 MHz frequency ranges.

The secondary transducer portion 11b is also positioned at a selected elevation above the substrate. In various configurations, the secondary transducer portion can be disposed proximate an outer edge of the primary transducer portion at an elevation above the substrate less than that of the primary transducer portion 11a such that the primary transducer portion rests above the secondary transducer portion. Again, although not shown, the secondary transducer portion can be disposed or otherwise secured to a side surface of a carrier which, in turn, is secured or otherwise secured to the substrate. Similar to the primary transducer portion, the secondary transducer portion includes a downwardly-projecting LPRF feed line contact 68 that engages, and becomes electrically coupled to, the LPRF port 52 of the antenna transducer. The secondary transducer portion also includes a downwardly-projecting GPS feed line contact 70 that engages, and becomes electrically coupled to, the GPS port 54 of the antenna transducer. In addition, the secondary transducer portion includes a downwardly-projecting ground contact 72 that engages, and becomes electrically coupled to, the ground port 58 of the antenna transducer, the ground port being further coupled to the substrate (i.e., electrical ground plane 56).

The secondary transducer portion 11b can extend in perpendicular directions such that, in operation, currents in the parts of the second antenna transducer portion exhibit right-handed circular polarization due to the configuration of the second antenna transducer portion and the relative positioning of the primary transducer portion Ha thereabove. Through appropriate placement of the cellular feed line contact 62, then, the energy transduced at the primary transducer portion facilitates inducement of the circular polarization characteristics exhibited by the secondary transducer portion.

More particularly, the secondary transducer portion 11b can include an elongated member 74 and a transverse-extending member 76 that extends from an end of the elongated member in a direction generally transverse to the longitudinal direction of the elongated member. The contacts can then be disposed such that the GPS feed line and ground contacts 70, 72 extend downwardly from a position proximate an end of the secondary transducer portion opposite the transverse-extending member, such as in the same manner as that of the transducer disclosed by the aforementioned U.S. Pat. No. 6,618,011. The LPRF feed line contact 68, on the other hand, extends downwardly from a position of the secondary transducer portion that permits efficient LPRF operation. Because LPRF techniques such as WLAN, Bluetooth, UWB and RFID operate in frequency bands above that of GPS, however, the LPRF feed line contact typically extends downwardly from a position of the secondary transducer portion between the GPS feed line contact and the open end of the transverse-extending member (i.e., the end opposite the elongated member).

Typically, the length of the secondary transducer portion 11b from the LPRF feed line contact 68 to the open end of the transverse-extending member 76 is configured such that the secondary transducer portion resonates within the LPRF frequency band, while the impedance of the GPS module 46 and GPS transmission line 50 approach an open circuit or a short circuit at the GPS port 54. Similarly, the length of the secondary transducer portion from the GPS feed line contact 70 to the open end of the transverse-extending member is configured such that the secondary transducer portion resonates within the GPS frequency band, while the impedance of the LPRF module 44 and LPRF transmission line 48 approaches an open circuit at the LPRF port 52. More particularly, for example, the sum of the lengths of the downwardly-extending LPRF feed line contact 68 and the transverse-extending member can equal approximately one-quarter wavelength of signals within the LPRF frequency band, while the sum of the downwardly-extending GPS feed line contact 70, elongated member and transverse-extending member equal approximately one-quarter wavelength of signals within the GPS frequency band.

Again referring to FIG. 3, to permit the secondary transducer portion 11b to effectively, selectively effectuate both LPRF and GPS communication, the GPS module 46 and GPS transmission line 50 can be configured such that the impedance of the GPS module and GPS transmission line approach an open circuit or a short circuit at the GPS port 54 when the secondary transducer portion is effectuating LPRF communication within the LPRF frequency band. Likewise, the LPRF module 44 and LPRF transmission line 48 can be configured such that the impedance of the LPRF module and LPRF transmission line approach an open circuit at the LPRF port 52 when the secondary transducer portion is effectuating GPS communication within the GPS frequency band. In such instances, the LPRF transmission line 48 and the GPS transmission line 50 can be configured for matched-impedance operation, such as at 50 Ohms, at the operative frequencies of the LPRF module and GPS module, respectively. As will be appreciated, by so configuring the GPS module and GPS transmission line, and the LPRF module and LPRF transmission line, the LPRF/GPS modules can be capable of transmitting and/or receiving a sufficient portion of the signals intended for the secondary transducer portion and/or the LPRF/GPS modules, respectively.

The LPRF/GPS modules 44, 46 and LPRF/GPS transmission lines 48, 50 can be configured in any of a number of different manners. For example, the length of the LPRF transmission line can be selected such that the impedance of the LPRF module and LPRF transmission line at the LPRF port 52 (i.e., the load impedance at the LPRF port) approaches or otherwise approximates an open circuit (i.e., $Z_L=\infty$ Ohms) at the GPS operative frequency band (e.g., approximately 1,575 MHz). Similarly, for example, the length of the GPS transmission line can be selected such that the impedance of the GPS module and the GPS transmission line at the GPS port 54 (i.e., the load impedance) approaches or otherwise approximates a short circuit (i.e., $Z_L=0$ Ohms) or an open circuit (i.e., $Z_L=\infty$ Ohms) at the LPRF operative frequency band (e.g., approximately 2,442 MHz for WLAN). By so configuring the LPRF/GPS modules and LPRF/GPS transmission lines, each module and transmission line can operate to effectuate communication via the antenna transducer 11 with reduced interference from the other module and transmission line.

As shown in FIG. 3, in accordance with lossless transmission theory, when the input impedance of the LPRF filter 44b (i.e., $Z_{in}$) at the LPRF transmission line 48 approaches a short circuit, the length of the LPRF transmission line can be selected to transform the filter impedance to approach an open circuit (i.e., $Z_L=\infty$ Ohms) at the LPRF port 52 in accordance with the following:

$$Z_{in} = \frac{Z_L + jZ_0\tan\beta l_{LPRF}}{Z_0 + jZ_L\tan\beta l_{LPRF}} \quad (1)$$

In equation (1), $\beta$ represents the phase constant of the LPRF transmission line, $l_{LPRF}$ represents the length of the LPRF transmission line, and $Z_0$ represents the characteristic impedance of the LPRF transmission line (e.g., 50 Ohms). As explained above, the LPRF filter can be configured such that the impedance of the LPRF filter at the LPRF transmission line approaches or approximates a short circuit to ground (i.e., $Z_{in}=0$ Ohms) at the GPS operative frequency band (e.g., approximately 1,575 MHz). Thus, as shown in equation (1), for the load impedance at the LPRF port to approach or approximate an open circuit while the input impedance to the LPRF transmission line approaches or approximates a short circuit, the product of the phase constant, $\beta$, and the length of the LPRF transmission line, $l_{LPRF}$, approaches or otherwise approximately equals $\pi/2$ (or an odd multiple thereof). That is, the product of the phase constant and the length of the LPRF transmission line can be expressed as follows:

$$\beta l_{LPRF} = \frac{\pi}{2} \quad (2)$$

As is well known to those skilled in the art, the phase constant, $\beta$, of the LPRF transmission line 48 at the GPS operative frequency band can be expressed as follows:

$$\beta = \frac{2\pi f_{GPS}}{c}\sqrt{\mu_r\varepsilon_r} \quad (3)$$

where $f_{GPS}$ represents the GPS operative frequency, c represents the speed of light in a vacuum (i.e., $c\approx3\times10^8$ m/s), and $\mu_r$ and $\varepsilon_r$ represent the relative permeability and permittivity, respectively, of the substrate 60. Combining equations (2) and (3), then, it can be shown that the length of the LPRF transmission line can be selected or otherwise determined as follows:

$$l_{LPRF} = \frac{c}{4f_{GPS}\sqrt{\mu_r \varepsilon_r}} \quad (4)$$

Presume that the relative permeability approaches or otherwise approximates unity (i.e., $\mu_r \approx 1.0$), as may be the case in one typical embodiment. Also, presuming that the relative permittivity of the PWB substrate 60 equals 3.5 (i.e., $\varepsilon_r = 3.5$), and that the GPS frequency equals 1,575 MHz (i.e., $f_{GPS} = 1,575$ MHz), the length of the LPRF transmission line can be selected or otherwise determined to equal approximately 25.45 mm (i.e., $(3\times10^8)/(4\times(1,575\times10^6)\times3.5^{1/2})$).

As will be appreciated, when the length of the GPS transmission line 50 is selected such that the impedance of the GPS module 46 and the GPS transmission line at the GPS port 54 (i.e., the load impedance) approaches or approximates an open circuit (i.e., $Z_L = \infty$ Ohms) at the LPRF operative frequency band (e.g., approximately 2,442 MHz for WLAN), the length of the GPS transmission line can generally be selected or otherwise determined in a manner similar that described above with respect to the LPRF transmission line 48. More particularly, for example, similar to equation (4), for the load impedance at the GPS port 54 to approach or approximate an open circuit while the input impedance to the GPS transmission line approaches or approximates a short circuit at the LPRF operative frequency, $f_{LPRF}$, the length, $l_{GPS}$, of the GPS transmission line 50 can be selected or otherwise determined as follows:

$$l_{GPS} = \frac{c}{4f_{LPRF}\sqrt{\mu_r \varepsilon_r}} \quad (5)$$

Again, presume that the relative permeability approximates 1.0, and that the relative permittivity of the PWB substrate 60 equals 3.5. For a LPRF frequency of 2,442 MHz for WLAN, for example, the length of the GPS transmission line can be selected or otherwise determined to equal approximately 16.42 mm (i.e., $(3\times10^8)/(4\times(2,442\times10^6)\times3.5^{1/2})$).

Alternatively, as indicated above, the GPS filter 46b can be configured such that the impedance of the GPS filter at the GPS transmission line 50 approaches or approximates an open circuit at the LPRF operative frequency band. In such instances, the length of the GPS transmission line can be selected such that the impedance of the GPS module 46 and the GPS transmission line at the GPS port 54 approaches or approximates a short circuit. Again in accordance with lossless transmission theory, and more particularly in accordance with equation (1) above, for the load impedance (i.e., $Z_L$) at the GPS port to approach or approximate a short circuit while the input impedance of the GPS filter at the GPS transmission line approaches or approximates an open circuit, the product of the phase constant, $\beta$, and the length of the GPS transmission line, $l_{GPS}$, approaches or otherwise approximately equals $\pi/2$ (or an odd multiple thereof). Thus, in such instances, the length of the GPS transmission line can again be selected or otherwise determined in accordance with equation (5).

Although the lengths of the transmission lines can be selected to transform an input impedance approaching a short circuit or an open circuit into the other one of the open circuit and short circuit, it should be understood that the length one or both of the transmission lines (i.e., LPRF transmission line 48 and/or GPS transmission line 50) can alternatively be selected to transform or otherwise maintain an input impedance (i.e., $Z_{in}$) approaching an open circuit at approximately the same input impedance. Further, the length of the GPS transmission line can be selected to transform or otherwise maintain an input impedance approaching a short circuit at approximately the same input impedance. In accordance with equation (1), for the load impedance (i.e., $Z_L$) at the LPRF port 52 to approach or approximate an open circuit while the input impedance to the LPRF transmission line 48 also approaches or approximates an open circuit, the product of the phase constant, $\beta$, and the length of the LPRF transmission line, $l_{LPRF}$, approaches or otherwise approximately equals $\pi$ (or a multiple thereof). That is, the product of the phase constant and the length of the LPRF transmission line can be expressed as follows:

$$\beta l_{LPRF} = \pi \quad (6)$$

Combining equations (3) and (6), then, it can be shown that when the input impedance to the LPRF transmission line approaches an open circuit, the length of the LPRF transmission line can be selected or otherwise determined as follows:

$$l_{LPRF} = \frac{c}{2f_{GPS}\sqrt{\mu_r \varepsilon_r}} \quad (7)$$

Similarly, it can be shown that the when the input impedance (i.e., $Z_{in}$) to the GPS transmission line 50 approaches an open circuit, the length of the GPS transmission line can be selected or otherwise determined as follows:

$$l_{GPS} = \frac{c}{2f_{LPRF}\sqrt{\mu_r \varepsilon_r}} \quad (8)$$

Further, for the load impedance (i.e., $Z_L$) at the GPS port 54 to approach or approximate a short circuit while the input impedance to the GPS transmission line also approaches or approximates a short circuit, the product of the phase constant, $\beta$, and the length of the GPS transmission line, $l_{GPS}$, approaches or otherwise approximately equals $\pi$ (or a multiple thereof). In such instances, then, the length of the GPS transmission line can be determined in accordance with equation (8).

Reference is now made to FIG. 5, which illustrates various steps in a method of selectively communicating in at least two frequency bands in accordance with one embodiment of the present invention. In the method, a first communication assembly, including a first communication module (e.g., LPRF module 44 or GPS module 46) and a first transmission line (e.g., LPRF transmission line 48 or GPS transmission line 50), is configured to operatively communicate first radio signals (e.g., LPRF or GPS) within a first frequency band via an antenna transducer 11, the first communication assembly and antenna transducer being coupled at a first port of the antenna transducer. Similarly, a second communication assembly, including a second communication module (e.g., other of the LPRF module and GPS module) and a second transmission line (e.g., other of the LPRF transmission line and GPS transmission line), is configured to operatively communicate second radio signals (e.g., other of LPRF or GPS) within a second frequency band via the same antenna transducer, the second communication assembly and antenna being coupled at a second port of the antenna transducer.

Thus, as shown in block 80, the method includes selectively transducing first radio signals at the antenna transducer 11. As the first radio signals are transduced within the first frequency band, the second communication assembly has an impedance at the second port approaching or otherwise approximately equal to a short circuit or an open circuit. More particularly, the second communication module can include second communication circuitry (e.g., GPS circuitry 46a) and a second filter (e.g., GPS filter 46b) between the second communication circuitry and the second transmission line (e.g., GPS transmission line 50). In such instances, as the first radio signals are transduced within the first frequency band, the second filter can have an impedance at the second transmission line approaching or otherwise approximately equal to a short circuit when the second communication assembly has an impedance at the second port approaching or otherwise approximately equal to an open circuit. Alternatively, the second filter can have an impedance at the second transmission line approaching or otherwise approximately equal to an open circuit when the second communication assembly has an impedance at the second port approaching or otherwise approximately equal to a short circuit. As can be seen, then, the second transmission line can be operative to transform the short circuit or open circuit impedance of the second filter to the other one of the short circuit and the open circuit impedance of the second communication assembly at the second port. As indicated above, by so configuring the second communication assembly, the first communication assembly can be capable of transmitting and/or receiving a sufficient portion of the signals intended for the antenna transducer and/or the first communication assembly, respectively.

As shown in block 82, the method also includes selectively transducing the second radio signals at the antenna transducer. Similar to before, as the second radio signals are transduced within the second frequency band, the first communication assembly has an impedance at the first port approaching or otherwise approximately equal to an open circuit. More particularly, the first communication module can include first communication circuitry (e.g., LPRF circuitry 44a) and a first filter (e.g., LPRF filter 44b) between the first communication circuitry and the second transmission line (e.g., GPS transmission line 48). In such instances, as the second radio signals are transduced within the second frequency band, the first filter can have an impedance at the first transmission line approaching or otherwise approximately equal to a short circuit. Also similar to before, the first transmission line can be operative to transform the short circuit impedance of the first filter to an open circuit impedance of the first communication assembly impedance at the first port. Further, by so configuring the first communication assembly, the second communication assembly can be capable of transmitting and/or receiving a sufficient portion of the signals intended for the antenna transducer and/or the second communication assembly, respectively.

As explained above, the antenna transducer 11 can be capable of transducing radio signals in a first frequency band (e.g., LPRF frequency band) and a second frequency band (e.g., GPS frequency band). It should be understood, however, that the antenna transducer can likewise be capable of transducing radio signals in more than two bands without departing from the spirit and scope of the present invention. For example, the antenna transducer can be configured to transduce GPS radio signals at approximately 1,575 MHz and WLAN radio signals at approximately 2,442 MHz, and can additionally be configured to transduce WLAN radio signals between approximately 5,150 and 5,825 MHz. In such instances, the antenna transducer can include additional ports, while the antenna includes additional communication modules and transformation elements. The communication modules and transformation elements, then, can be designed or otherwise selected in a manner similar to those explained above.

As also explained above, a filter (LPRF filter 44b, GPS filter 46b) can have an input impedance (i.e., $Z_{in}$) at a respective transmission line (LPRF transmission line 48, GPS transmission line 50) approaching a short circuit or an open circuit in various instances. It should be understood, however, that the filter can alternatively have any of a number of other impedances without departing from the spirit and scope of the present invention. For example, the filter can alternatively be designed or otherwise configured to provide a large standing wave ratio (SWR) (i.e., a filter impedance close to the exterior of a Smith chart) at the respective transmission line. Generally, then, irrespective of the input impedances of the filters, the transformation elements (e.g., transmission lines) can be configured, designed, selected or otherwise adapted to transform the input impedances into a load impedance at a respective port of the antenna transducer, the load impedance approaching an open circuit (LPRF port 52, GPS port 54) or a short circuit (lower frequency band port, e.g., GPS port 54).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
    a first port and a second port that is physically separated from the first port; and
    a transducer portion having an open end, a first feed line contact projecting from the transducer portion and engaging the first port, and a second feed line contact projecting from the transducer portion and engaging the second port, the first and second feed line contacts being positioned along the transducer portion at respective lengths from the open end of the transducer portion,
    wherein the apparatus is configured to selectively transduce at least one of first radio signals at least one of to or from the first port within a first frequency band, or second radio signals at least one of to or from the second port within a second frequency band,
    wherein the sum of the length of the transducer portion from the open end to the first feed line contact, and the length of the first feed line contact, is configured such that the transducer portion resonates within the first frequency band, and wherein the sum of the length of the transducer portion from the open end to the second feed line contact, and the length of the second feed line contact, is configured such that the transducer portion resonates within the second frequency band.

2. The apparatus of claim 1, wherein the sum of the length of the transducer portion from the open end to the first feed line contact, and the length of the first feed line contact, is configured such that the transducer portion resonates within the first frequency band while an impedance at the second port approaches one of a short circuit or an open circuit, and wherein the sum of the length of the transducer portion from the open end to the second feed line contact, and the length of the second feed line contact, is configured such that the transducer portion resonates within the second frequency band while an impedance at the first port approaches an open circuit.

3. The apparatus of claim 1, wherein the sum of the length of the transducer portion from the open end to the first feed line contact, and the length of the first feed line contact, is equal to approximately one-quarter or integer multiple of one-quarter wavelength or effective wavelength of the first radio signals within the first frequency band, and wherein the sum of the length of the transducer portion from the open end to the second feed line contact, and the length of the second feed line contact, is equal to approximately one-quarter or integer multiple of one-quarter wavelength or effective wavelength of the second radio signals within the second frequency band.

4. The apparatus of claim 1, wherein the transducer portion is configured to be disposed on a carrier that is secured to a substrate to thereby position the transducer portion at a selected elevation above the substrate.

5. The apparatus of claim 1, wherein the first port is couplable to a first communication assembly configured to operatively communicate the first radio signals within a first frequency band via the antenna transducer, and
wherein the apparatus is configured such that, when the apparatus is coupled to the first communication assembly and the apparatus transduces the second radio signals, the first communication assembly has an impedance at the first port approaching an open circuit.

6. The apparatus of claim 5, wherein the first port being couplable to a first communication assembly includes being couplable to a first communication assembly including a first communication circuitry, a first filter and a first transformation element, the first filter being coupled between the first communication circuitry and the first transformation element, the first transformation element being couplable to the first port, and
wherein the apparatus is configured such that, when the apparatus is coupled to the first communication assembly and the apparatus transduces the second radio signals, the first transformation element transforms an impedance of the first filter at the first transformation element to the open circuit impedance of the first communication assembly at the first port.

7. The apparatus of claim 6, wherein the apparatus is configured such that, when the apparatus is coupled to the first communication assembly and the apparatus transduces the second radio signals, (a) the first filter has an impedance at the first transformation element approaching a short circuit, and (b) the first transformation element transforms the short circuit impedance of the first filter to the open circuit impedance of the first communication assembly at the first port.

8. The apparatus of claim 6, wherein the apparatus is configured such that, when the apparatus is coupled to the first communication assembly and the apparatus transduces the second radio signals, (a) the first filter has an impedance at the first transformation element approaching an open circuit, and (b) the first transformation element maintains the open circuit impedance of the first filter at approximately the same open circuit impedance of the first communication assembly at the first port.

9. The apparatus of claim 5, wherein the second port is couplable to a second communication assembly configured to operatively communicate the second radio signals within a second frequency band via the antenna transducer, and
wherein the apparatus is configured such that, when the apparatus is coupled to the second communication assembly and the apparatus transduces the first radio signals, the second communication assembly has an impedance at the second port approaching one of a short circuit or an open circuit.

10. The apparatus of claim 9, wherein the second port being couplable to a second communication assembly includes being couplable to a second communication assembly including a second communication circuitry, a second filter and a second transformation element, the second filter being coupled between the second communication circuitry and the second transformation element, and the second transformation element being couplable to the second port, and
wherein the apparatus is configured such that, when the apparatus is coupled to the second communication assembly and the apparatus transduces the first radio signals, the second transformation element transforms an impedance of the second filter at the second transformation element to the one of the short circuit or open circuit impedance of the second communication assembly at the second port.

11. The apparatus of claim 10, wherein the apparatus is configured such that, when the apparatus is coupled to the second communication assembly and the apparatus transduces the first radio signals, (a) the second filter has an impedance at the second transformation element approaching one of a short circuit or an open circuit, and (b) the second transformation element transforms the one of the short circuit or open circuit impedance of the second filter to the other one of the short circuit or open circuit impedance of the second communication assembly at the second port.

12. The apparatus of claim 10, wherein the apparatus is configured such that, when the apparatus is coupled to the second communication assembly and the apparatus transduces the first radio signals, (a) the second filter has an impedance at the second transformation element approaching one of a short circuit or an open circuit, and (b) the second transformation element transforms the one of the short circuit or open circuit impedance of the second filter to the same one of the short circuit or open circuit impedance of the second communication assembly at the second port.

13. The apparatus of claim 1, wherein the first port is couplable to a first communication assembly configured to operatively communicate low power radio frequency (LPRF) radio signals within the first frequency band via the apparatus, and wherein the second port is couplable to a second communication assembly configured to operatively communicate global positioning system (GPS) radio signals within the second frequency band via the apparatus.

14. The apparatus of claim 1 further comprising:
a primary transducer portion configured to effectuate communication in accordance with a cellular communication technique; and
a second transducer portion including the transducer portion, first and second feed line contacts, and the first port and the second port.

15. The apparatus of claim 14, wherein the transducer portion forms at least part of an inverted F-antenna (IFA) transducer.

16. An apparatus comprising:
an antenna transducer comprising a first port and a second port that is physically separated from the first port, wherein the antenna transducer further includes a transducer portion having an open end, a first feed line contact projecting from the transducer portion and engaging the first port, and a second feed line contact projecting from the transducer portion and engaging the second port, the first and second feed line contacts being positioned along the transducer portion at respective lengths from the open end of the transducer portion, wherein the antenna transducer is configured to selectively transduce at least one of first radio signals at least one of to or from the first port within a first frequency band, or second radio signals at least one of to or from the second port within a second frequency band, wherein the sum of the length of the transducer portion from the open end to the first feed line contact, and the length of the first feed line contact, is configured such that the transducer portion resonates within the first frequency band, and wherein the sum of the length of the transducer portion from the open end to the second feed line contact, and the length of the second feed line contact, is configured such that the transducer portion resonates within the second frequency band;

a communication module configured to operatively communicate radio signals within a frequency band via the antenna transducer; and a transformation element coupled to the communication module and the first port of the antenna transducer, and wherein at least one of the communication module or transformation element are configured such that, when the antenna transducer transduces the second radio signals, an impedance at the first port approaches one of a short circuit or an open circuit.

17. The apparatus of claim 16, wherein the sum of the length of the transducer portion from the open end to the first feed line contact, and the length of the first feed line contact, is equal to approximately one-quarter or integer multiple of one-quarter wavelength or effective wavelength of the first radio signals within the first frequency band, wherein the sum of the length of the transducer portion from the open end to the second feed line contact, and the length of the second feed line contact, is equal to approximately one-quarter or integer multiple of one-quarter wavelength or effective wavelength of the second radio signals within the second frequency band.

18. The apparatus of claim 16 further comprising:
a substrate; and
a carrier secured to the substrate, wherein the transducer portion is disposed on the carrier to thereby position the transducer portion at a selected elevation above the substrate.

19. The apparatus of claim 16, wherein the communication module comprises a communication circuitry and a filter, wherein the filter is coupled between the communication circuitry and the transformation element, and the transformation element is coupled to the first port of the antenna transducer, and wherein at least one of the filter or the transformation element are configured such that, when the antenna transducer transduces the second radio signals, the transformation element transforms an impedance of the filter at the transformation element to the one of the short circuit or open circuit impedance at the first port.

20. The apparatus of claim 19, wherein the transformation element comprises a transmission line configured to transform the impedance of the filter to the one of the short circuit or open circuit impedance at the first port.

21. The apparatus of claim 19, wherein at least one of the filter or the transformation element are configured such that, when the antenna transducer transduces the second radio signals, the filter has an impedance at the transformation element approaching one of an short circuit or an open circuit, and such that the transformation element transforms the one of the open circuit or short circuit impedance of the filter to the other one of the short circuit or open circuit impedance at the first port.

22. The apparatus of claim 19, wherein at least one of the filter or the transformation element are configured such that, when the antenna transducer transduces the second radio signals, the filter has an impedance at the transformation element approaching one of an short circuit or an open circuit, and such that the transformation element transforms the one of the open circuit or short circuit impedance of the filter to the same one of the short circuit or open circuit impedance at the first port.

23. The apparatus of claim 16, wherein the communication module is configured to operatively communicate low power radio frequency (LPRF) radio signals via the antenna transducer, and wherein the transformation element is coupled to an antenna transducer configured to selectively transduce at least one of LPRF radio signals at least one of to or from the first port, or global positioning system (GPS) radio signals at least one of to or from the second port.

24. The apparatus of claim 16, wherein the communication module is configured to operatively communicate global positioning system (GPS) radio signals via the antenna transducer, and wherein the transformation element is coupled to an antenna transducer configured to selectively transduce at least one of GPS radio signals at least one of to or from the first port, or low power radio frequency (LPRF) radio signals at least one of to or from the second port.

25. The apparatus of claim 16, wherein the transformation element is coupled to an antenna transducer including a primary transducer portion configured to effectuate communication in accordance with a cellular communication technique, and a second transducer portion including the transducer portion, first and second feed line contacts, and the first port and the second port.

* * * * *

UNITED STATES PATENT AND TRADEMARK OFFICE
CERTIFICATE OF CORRECTION

| | | |
|---|---|---|
| PATENT NO. | : 7,831,230 B2 | Page 1 of 1 |
| APPLICATION NO. | : 12/326337 | |
| DATED | : November 9, 2010 | |
| INVENTOR(S) | : Nail et al. | |

It is certified that error appears in the above-identified patent and that said Letters Patent is hereby corrected as shown below:

Column 8, Line 13, insert --within a second frequency band, where at least a portion of the second frequency band is-- between the words "signals" and "lower".

Column 10, Line 58, delete "Ha" and insert --11a--.

Signed and Sealed this
Tenth Day of January, 2012

David J. Kappos
*Director of the United States Patent and Trademark Office*